United States Patent
Murasawa et al.

(10) Patent No.: US 11,108,999 B2
(45) Date of Patent: Aug. 31, 2021

(54) IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventors: Kouta Murasawa, Yokohama (JP); Hidetsugu Kagawa, Kawasaki (JP); Shuhei Ogawa, Kawasaki (JP); Maya Yazawa, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 11 days.

(21) Appl. No.: 16/793,419

(22) Filed: Feb. 18, 2020

(65) Prior Publication Data
US 2020/0275065 A1  Aug. 27, 2020

(30) Foreign Application Priority Data
Feb. 27, 2019 (JP) .............................. JP2019-034735

(51) Int. Cl.
*H04N 9/04* (2006.01)
*H04N 5/235* (2006.01)

(52) U.S. Cl.
CPC ....... *H04N 9/04513* (2018.08); *H04N 5/2355* (2013.01)

(58) Field of Classification Search
CPC .. H04N 9/04513; H04N 5/2355; H04N 1/409; H04N 1/4072; H04N 9/646; H04N 9/77
See application file for complete search history.

(56) References Cited

U.S. PATENT DOCUMENTS

| | | | |
|---|---|---|---|
| 8,008,562 B2 | 8/2011 | Ikeda et al. | |
| 8,705,889 B2 | 4/2014 | Murasawa | |
| 8,817,326 B2 | 8/2014 | Murasawa | |
| 9,704,221 B2 | 7/2017 | Hori et al. | |
| 9,769,352 B2 | 9/2017 | Yanai et al. | |
| 10,582,087 B2 | 3/2020 | Ogawa et al. | |
| 2019/0158688 A1 | 5/2019 | Murasawa et al. | |
| 2019/0246087 A1* | 8/2019 | Uesaka | H04N 9/7925 |
| 2019/0364171 A1* | 11/2019 | Suwa | G06K 15/1872 |
| 2020/0007695 A1* | 1/2020 | Kagawa | H04N 1/00167 |
| 2020/0007712 A1* | 1/2020 | Ogawa | G06T 5/009 |
| 2020/0007717 A1* | 1/2020 | Suwa | H04N 1/6097 |
| 2020/0007734 A1* | 1/2020 | Kagawa | H04N 5/2355 |
| 2020/0013149 A1* | 1/2020 | Yazawa | H04N 1/644 |
| 2020/0013150 A1* | 1/2020 | Kagawa | H04N 1/6027 |
| 2020/0068183 A1* | 2/2020 | Bist | H04N 9/77 |

(Continued)

FOREIGN PATENT DOCUMENTS

JP  2011-086976 A  4/2011

*Primary Examiner* — Shahbaz Nazrul
(74) *Attorney, Agent, or Firm* — Venable LLP

(57) ABSTRACT

An image processing apparatus, comprises: a detection unit configured to detect a predetermined region of an image from image data; and a correction unit configured to correct a value of luminance in the predetermined region detected by the detection unit. The correction unit corrects a high-frequency value out of a low-frequency value and the high-frequency value obtained from a luminance value of a pixel having a value of luminance higher than a predetermined threshold in the predetermined region so that a high-frequency contrast weakens.

15 Claims, 10 Drawing Sheets

(56) References Cited

U.S. PATENT DOCUMENTS

2020/0104654 A1 4/2020 Mochizuki et al.
2020/0106927 A1 4/2020 Tsuchiya et al.
2020/0272374 A1* 8/2020 Kawai .................... G09G 5/10

* cited by examiner

| EV$_{100}$ | LIGHT INTENSITY | LUMINANCE |
|---|---|---|
|  | LUX | cd/m$^2$ |
| 3 | 20 | 1.2 |
| 4 | 40 | 2.3 |
| 5 | 81 | 4.7 |
| 6 | 163 | 9.3 |
| 7 | 325 | 18.6 |
| 8 | 650 | 37.2 |
| 9 | 1,300 | 74.5 |
| 10 | 2,600 | 149 |
| 11 | 5,200 | 298 |
| 12 | 10,400 | 596 |
| 13 | 20,800 | 1,190 |
| 14 | 41,600 | 2,380 |
| 15 | 83,200 | 4,770 |
| 16 | 166,000 | 9,510 |
| 17 | 333,000 | 19,100 |
| 18 | 666,000 | 38,200 |
| 19 | 1,330,000 | 76,200 |
| 20 | 2,660,000 | 152,000 |

FIG. 12
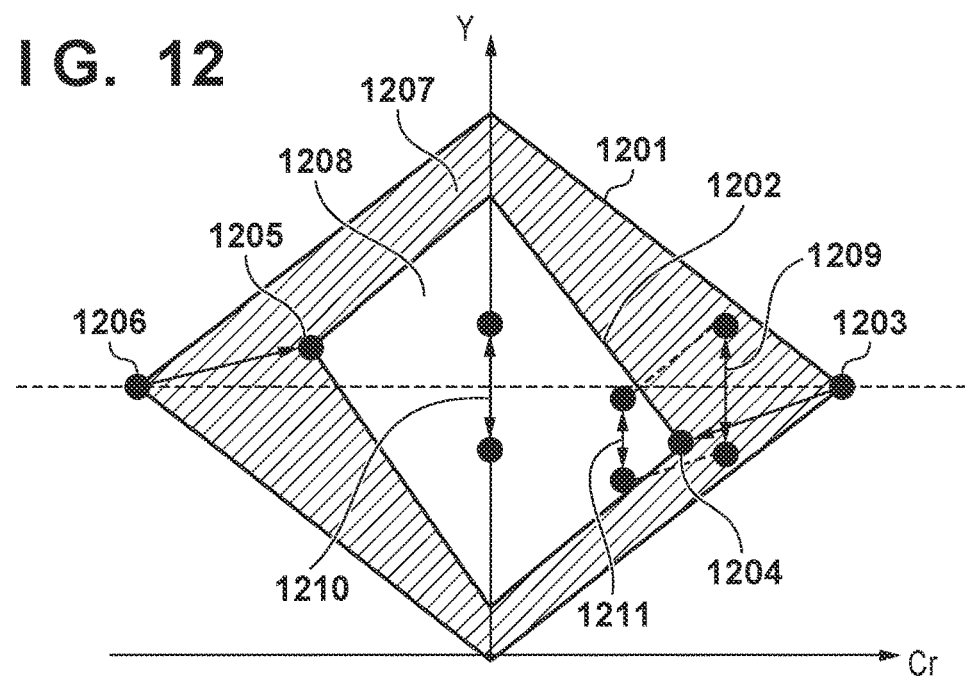
FIG. 13
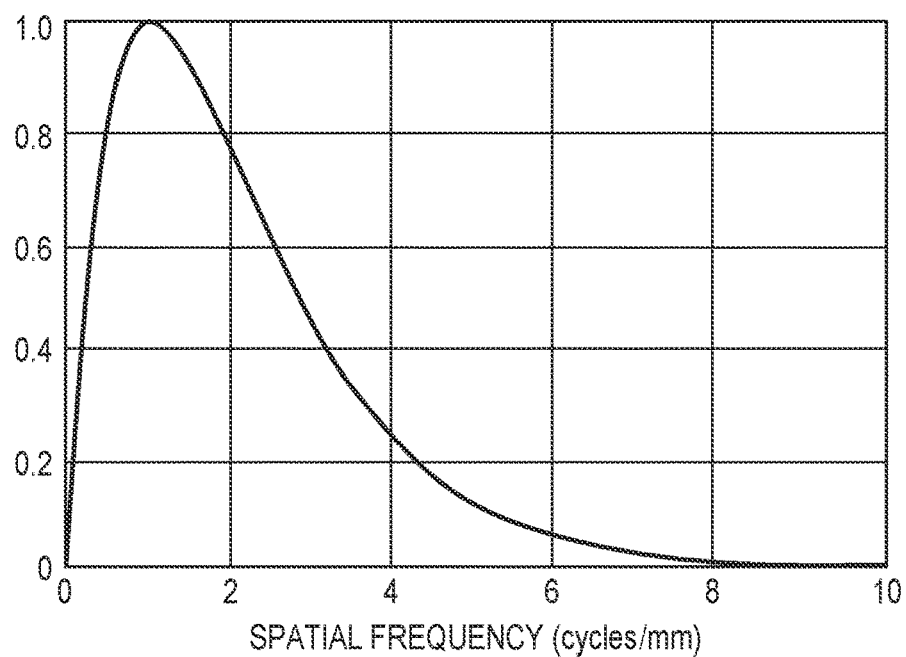
FIG. 14
|  | REFERENCE COLOR | CONTRAST TARGET COLOR | ΔRGB |
|---|---|---|---|
| INPUT | (224, 0, 0) | (232, 8, 8) | 13.9 |
| OUTPUT | (220, 8, 8) | (216, 12, 12) | 6.9 |

IMAGE PROCESSING APPARATUS, IMAGE PROCESSING METHOD, AND NON-TRANSITORY COMPUTER-READABLE STORAGE MEDIUM

BACKGROUND OF THE INVENTION

Field of the Invention

The present invention relates to an image processing apparatus, an image processing method, and a non-transitory computer-readable storage medium.

Description of the Related Art

In recent years, HDR (High Dynamic Range) content which has a reproduction range with a high luminance and a wide color gamut have become widespread. Some HDR content has 1000 nit as the luminance range to be expressed, and BT.2020 as the color gamut. When HDR image data which is HDR content is printed by a printing apparatus, it is necessary to use a tone curve or the like to perform D range compression from the dynamic range (hereinafter, referred to as D range) of the HDR content to the D range that can be reproduced by the printing apparatus. For example, a D range compression of the luminance range can be performed by reducing the contrast of a region having a high luminance. Japanese Patent Laid-Open No. 2011-86976 discloses image processing for correcting a reduction in contrast when D range compression is performed.

It is widely known that high sensitivity noise occurs when a digital camera performs capturing with increased sensor sensitivity. When content having a wide D range, such as 1000 nit, is captured, high sensitivity noise occurs uniformly at any luminance, and therefore, the content is noticeably affected by the noise. Conventionally, when D range compression is performed using a tone curve or the like, the noise of the bright portion is compressed together with the signal value, so that the influence of the noise is small. In addition, when content having a wide D range is displayed by a high luminance monitor, slight change such as noise cannot be discriminated in relation to the visual sensitivity of a person with respect to high luminance, so that the influence of noise is small. However, when a contrast correction of content having a wide D range is performed by the method described in Japanese Patent Laid-Open No. 2011-86976, noise is emphasized in a low luminance region, and thus an image that is more conspicuously affected by the noise than in the past is generated.

SUMMARY OF THE INVENTION

The present invention in one aspect provides an image processing apparatus, comprising: a detection unit configured to detect a predetermined region of an image from image data; and a correction unit configured to correct a value of luminance in the predetermined region detected by the detection unit, wherein the correction unit corrects a high-frequency value out of a low-frequency value and the high-frequency value obtained from a luminance value of a pixel having a value of luminance higher than a predetermined threshold in the predetermined region so that a high-frequency contrast weakens.

According to the present invention, it is possible to suppress the influence of noise while correcting contrast between input and output.

Further features of the present invention will become apparent from the following description of exemplary embodiments with reference to the attached drawings.

BRIEF DESCRIPTION OF THE DRAWINGS

FIG. 12 is a diagram for describing gamut mapping according to an embodiment of the present invention.

FIG. 13 is a diagram for describing an example of a visual transfer function according to an embodiment of the present invention.

FIG. 14 is a diagram for describing an example of a correction intensity generation method according to the second embodiment.

DESCRIPTION OF THE EMBODIMENTS

Figure 1:
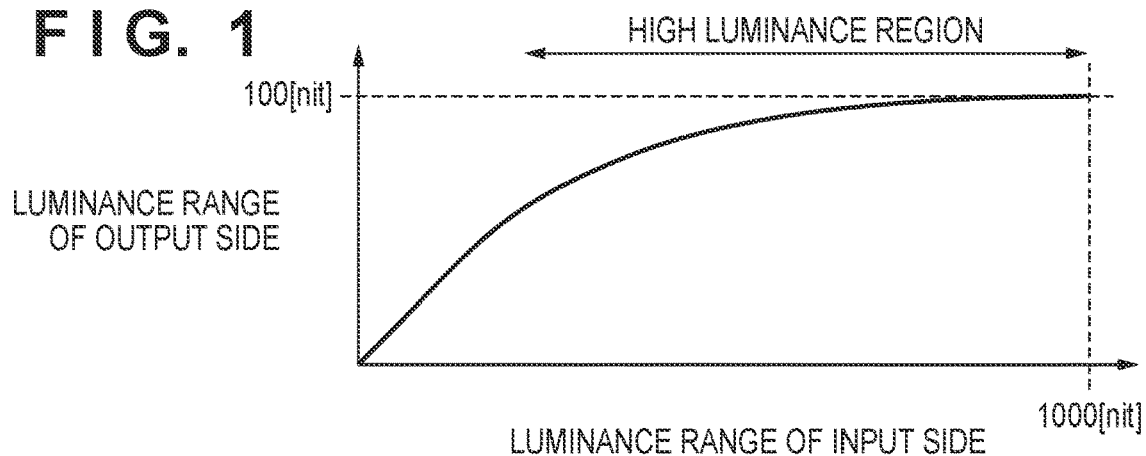
FIG. 1 is a diagram of a dynamic range compression curve according to an embodiment of the present invention.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

[System Configuration]

Figure 3:
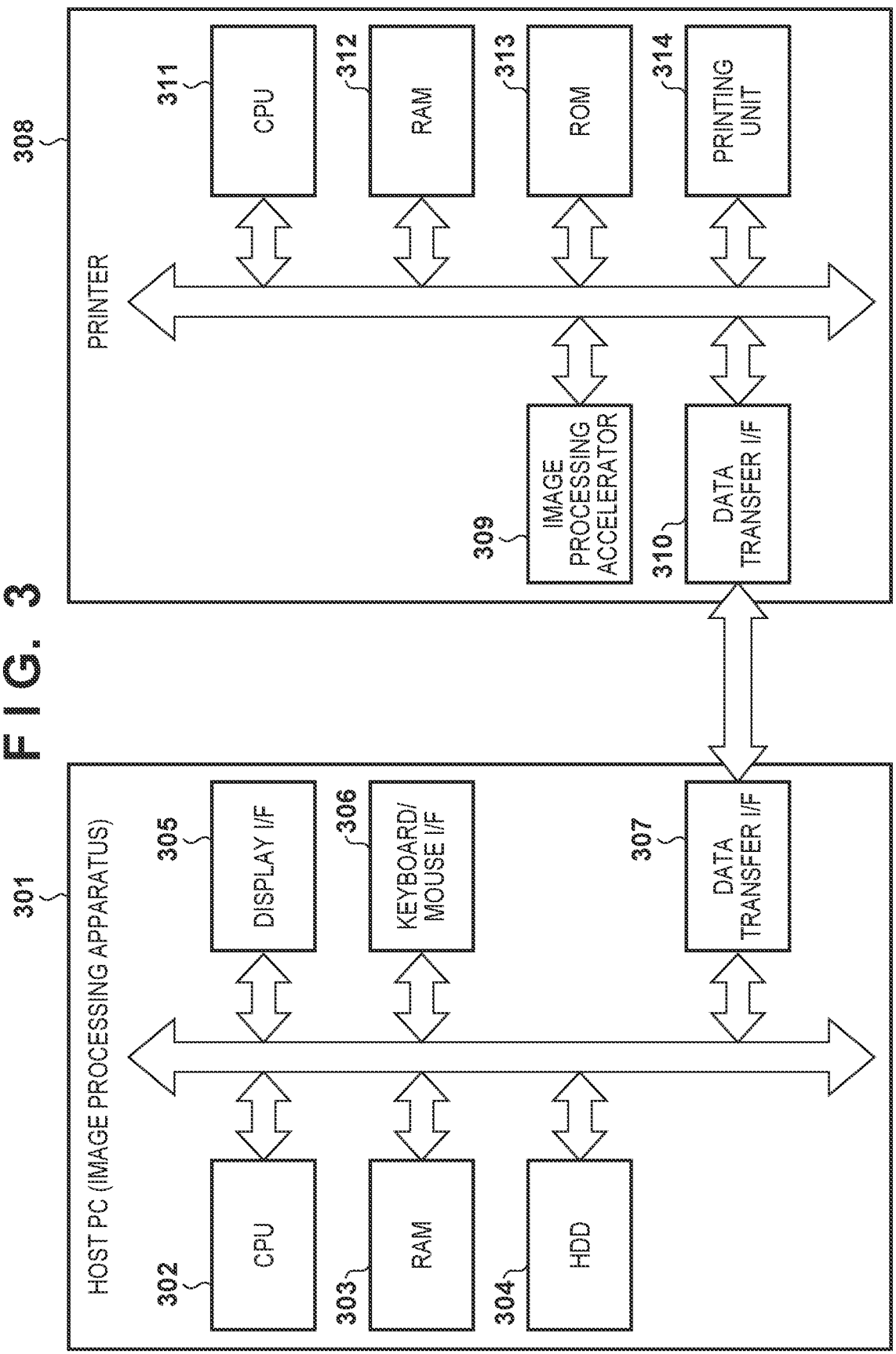
FIG. 3 is a block diagram of an image processing apparatus and a printer according to an embodiment of the present invention.

FIG. 3 is a diagram showing an example of a hardware configuration of a system in which the present invention can be used. In the present embodiment, the system is configured by including an image processing apparatus 301 as a host PC and a printer 308 as an image forming apparatus. The image processing apparatus 301 is configured by including a CPU (Central Processing Unit) 302, a RAM (Random Access Memory) 303, an HDD (Hard Disc Drive) 304, a display I/F (interface) 305, an input unit I/F 306, and a data transfer I/F 307. The CPU 302 executes various processes while using the RAM 303 as a work area in accordance with programs held in the HDD 304. For example, the CPU 302 generates image data that can be printed by the printer 308 in accordance with commands received from the user via the input unit I/F 306 and programs stored in the HDD 304. Then, the CPU 302 transfers the generated image data to the printer 308. Further, the CPU 302 performs predetermined processing on the image data received from the printer 308 via the data transfer I/F 307 in accordance with programs stored in the HDD 304. The results and various pieces of information are displayed on a display (not shown) via a display I/F 305. In the image processing apparatus 301, the respective units are connected so as to be able to communicate with each other.

The printer 308 is configured by including a CPU 311, RAM 312, ROM 313, an image processing accelerator 309, a data transfer I/F 310, and a printing unit 314. The CPU 311 executes various processes while using the RAM 312 as a work area in accordance with programs held in the ROM 313. The image processing accelerator 309 is hardware capable of executing image processing faster than the CPU 311. The image processing accelerator 309 is activated when the CPU 311 writes parameters and data required for image processing to predetermined addresses of the RAM 312, reads the parameters and data, and then executes predetermined image processing on the data. Note that the image processing accelerator 309 is not an indispensable element, and configuration may be taken to execute the same processing by the CPU 311 and omit the image processing accelerator 309. The printing unit 314 performs printing processing on a print medium based on the image data processed by the CPU 311 or the image processing accelerator 309. The printing unit 314 can perform printing by an inkjet method, for example, but may be configured to perform printing by another method.

As a connection method in the data transfer I/F 307 of the image processing apparatus 301 and the data transfer I/F 310 of the printer 308, USB, IEEE 1394, a wired LAN, a wireless LAN, or the like can be used, but the connection method is not limited thereto. Further, in the case of the example shown in FIG. 3, illustration was given of an example in which the system is provided with the image processing apparatus 301 and the printer 308 as different apparatuses, but these may be realized by a single apparatus.

[Description of Overall Image Processing]

Hereinafter, the contrast correction processing according to the present embodiment will be described in detail. The contrast correction processing according to the present embodiment is processing for performing predetermined image processing when HDR image data is printed by the printer 308.

Figure 4:
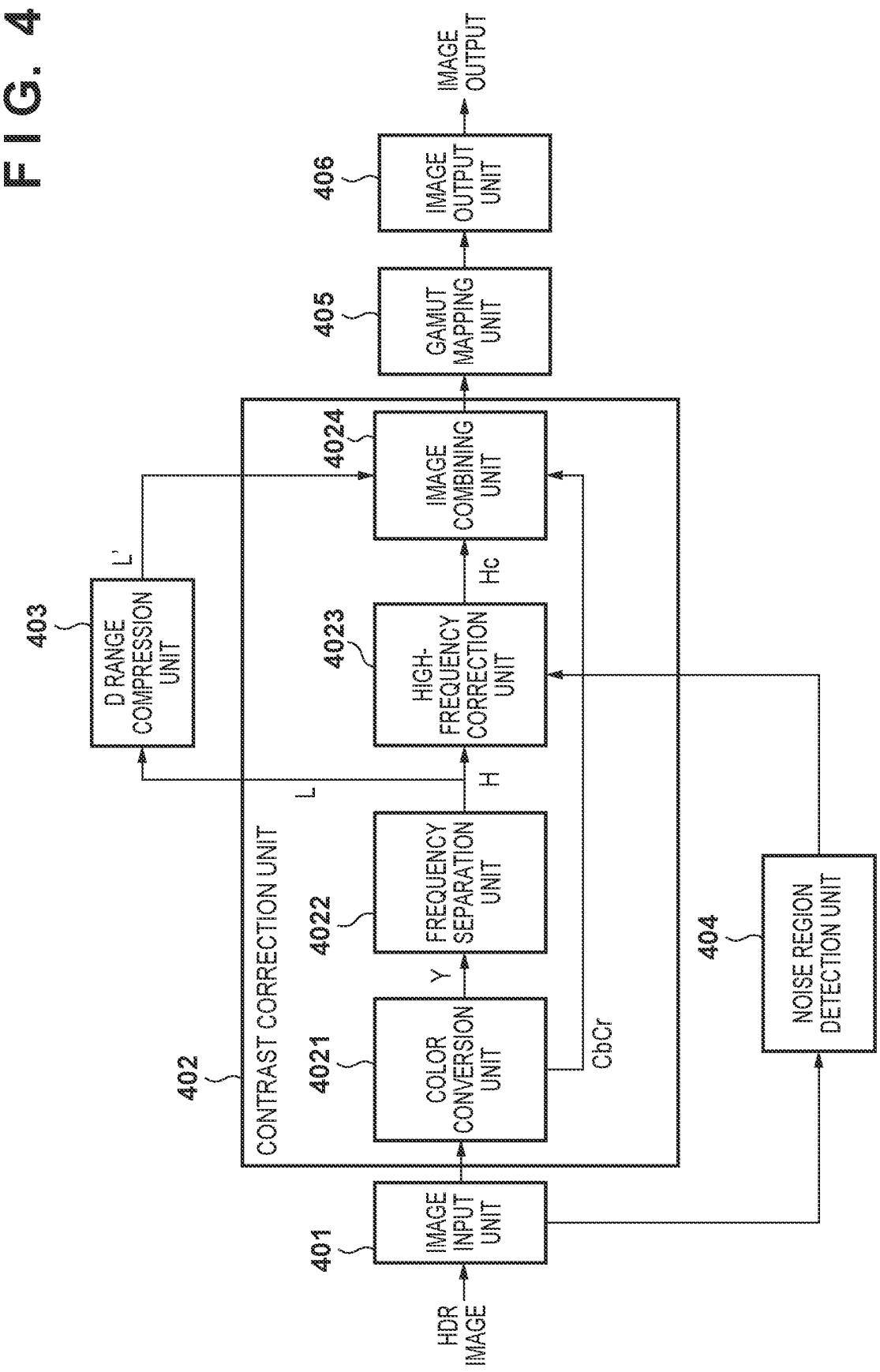
FIG. 4 is a diagram showing an example of a software configuration according to the first embodiment.

FIG. 4 is a diagram showing an example of a software configuration for describing image processing when HDR image data is printed by the printer 308. The image input unit 401 obtains HDR image data. In the present embodiment, description is given of an example in which the HDR image data has a luminance range of 1000 nit, and the color gamut is RGB data of BT.2020. The HDR image data is image data captured by a digital camera, and may be directly obtained from the digital camera or may be obtained via a network. In addition to the HDR image data, the image input unit 401 also obtains capturing information when the HDR image data is captured. The capturing information includes information such as a shutter speed, an exposure period, a lens aperture value, ISO sensitivity, and a dynamic range at the time of capturing. In addition, information such as distance information of the subject, white balance, focal length, and a photometric method may be obtained.

A contrast correction unit 402 performs a process of correcting the contrast that is reduced in a D range compression unit 403. The contrast correction unit 402 will be described in more detail. The contrast correction unit 402 is configured by including a color conversion unit 4021, a frequency separation unit 4022, a high-frequency correction unit 4023, and an image combining unit 4024.

The color conversion unit 4021 converts inputted RGB data into an image signal representing a color value of luminance and color difference. In the present embodiment, a color chart of the converted data will be described using YCbCr. The conversion from RGB to YCbCr is represented by Equations (1) to (3). Note that, in Equations (1) to (3), the symbol "·" represents a product.

$$Y = 0.299 \cdot R + 0.587 \cdot G + 0.114 \cdot B \quad \text{Equation (1)}$$

$$Cb = -0.1687 \cdot R - 0.3313 \cdot G + 0.5 \cdot B \quad \text{Equation (2)}$$

$$Cr = 0.5 \cdot R - 0.4187 \cdot G - 0.0813 \cdot B \quad \text{Equation (3)}$$

Note that the color chart used in the color conversion unit 4021 is not limited to YCrCb. For example, an xyY color system, a CIE L*a*b* (CIELAB) color space representing lightness and color differences, and an HSL color space representing hue, saturation, and lightness may be used. In each color chart, the lightness (L of Lab or L of HSL) corresponds to the luminance value (Y) in YCrCb. Therefore, the conversion formula differs depending on the color chart used.

Figure 7:
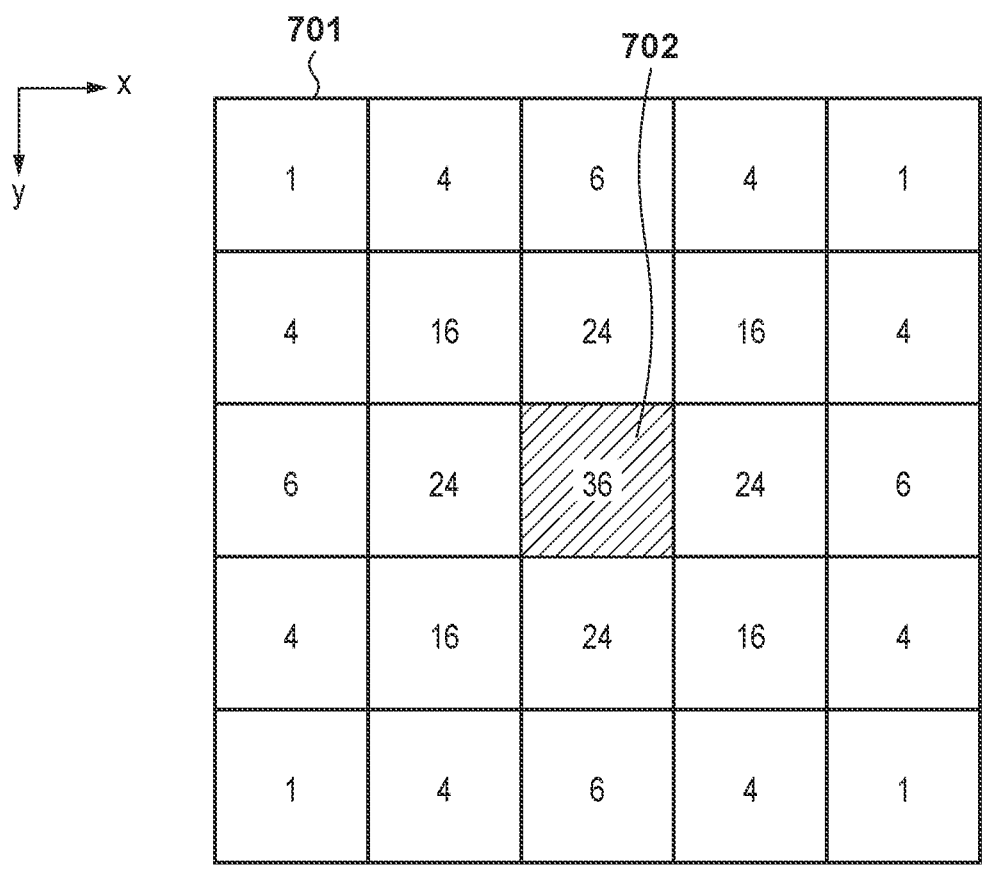
FIG. 7 is a diagram showing an example of filter coefficients according to an embodiment of the present invention.

The frequency separation unit 4022 divides the luminance value Y of the input image data into a first component and a second component. For the combination of the first component and the second component, either a combination of the high-frequency value H and the low-frequency value L or a combination of a value R of reflected light and a value Li of illuminating light can be used. The generation method will be described below. The low-frequency value L is generated by performing a filtering process of a predetermined frequency on the luminance value Y. The filtering process will be described with reference to FIG. 7 by taking a Gaussian filter as an example. The filter size represents a size of 5×5, and a coefficient value 701 is set for each pixel. Let the horizontal direction of the image be x, the vertical direction be y, the pixel values of the coordinates (x, y) be p(x, y), and the filter coefficient values be f(x, y). Then, the filtering process is performed for each pixel of interest by the method represented by the following Equation (4). The calculation of Equation (4) is performed every time the filter scans the image data centering on a pixel of interest 702. When the filter has finished scanning all the pixels, a low-frequency value L is obtained. Note that, in Equation (4), the symbol "·" represents a product.

$$p'(x,y) = \{1/\Sigma f(x,y)\} \cdot \Sigma \{f(x,y) \times p(x,y)\} \quad \text{Equation (4)}$$

In the present embodiment, description is given of an example in which the filter characteristic is of a Gaussian type, but there is no limitation to this. For example, an edge preserving filter such as a bilateral filter may be used. The use of an edge preserving filter can reduce a halo of an artifact that occurs in an edge portion when a contrast correction is performed.

FIG. 13 is a diagram showing a visual transfer function VTF with respect to a spatial frequency. The visual transfer function VTF shown in FIG. 13 shows that the visual sensitivity shown on the vertical axis changes in accordance with change in the spatial frequency shown on the horizontal axis. It can be seen that the visual transfer function VTF has a high transfer characteristic of about 0.8 or more when the spatial frequency is 0.5 cycle/mm or more. It is desirable that the predetermined frequency for which the contrast is to be corrected is a frequency with high visual sensitivity. Therefore, in the present embodiment, a high-frequency indicates a frequency of 0.5 cycle/mm or more which includes a peak sensitivity, and a low-frequency indicates a frequency less than 0.5 cycle/mm.

Assuming that the luminance value is Y, the high-frequency value is H, and the low-frequency value is L for each pixel, the high-frequency value H is calculated by the following Equation (5).

$$L=Y/H \qquad \text{Equation (5)}$$

In the present embodiment, description is given by assuming that a high-frequency value H and a low-frequency value L of the luminance value Y are respectively the same as the value R of the reflected light and the value Li of the illuminating light.

The value of the illuminating light can also be generated by performing a filtering process in a similar manner as for the low-frequency value. In addition, if an edge preserving filter is used, the value of the illuminating light of the edge portion can be generated with higher accuracy. The value Re of the reflected light and the value Li of the illuminating light can be calculated by the following Equation (6) similarly to Equation (5).

$$Re=Y/Li \qquad \text{Equation (6)}$$

The high-frequency value H was generated by dividing the input image by the low-frequency value as represented by Equation (5). However, there is no limitation to this, and it may be generated by subtracting a low-frequency value from an input image as represented by the following Equation (7).

$$H=Y-L \qquad \text{Equation (7)}$$

The high-frequency correction unit 4023 performs a contrast correction on the high-frequency value H separated in the frequency separation unit 4022 by performing luminance intensity correction described later, and generates a contrast-corrected high-frequency value Hc.

The image combining unit 4024 uses the image data which is the correction results and the conversion result to perform a recombination to a color image. The contrast-corrected high-frequency value Hc output from the high-frequency correction unit 4023, the compressed low-frequency value L' output from the D range compression unit 403, and the color difference (Cb, Cr) output from the color conversion unit 4021 are input. The method of combining is represented by the following Equation (8). In Equation (8), the luminance image Yc is obtained by integrating the high-frequency value Hc and the D-range-compressed low-frequency value L'.

$$Yc=Hc\cdot L' \qquad \text{Equation (8)}$$

When the frequency separation unit 4022 generates the high-frequency value H as represented by the Equation (7), the luminance image Yc can be calculated by the following Equation (9).

$$Yc=Hc+L' \qquad \text{Equation (9)}$$

Then, the image combining unit 4024 combines the luminance image Yc and the color difference (Cb, Cr) to generate a color image (Yc, Cb, Cr), and outputs the color image (Yc, Cb, Cr) to the gamut mapping unit 405.

The D range compression unit 403 performs D range compression to a predetermined luminance range on inputted data by using means such as a one-dimensional look-up table (hereinafter referred to as "1DLUT"). FIG. 1 is a diagram for describing D range compression. In FIG. 1, the horizontal axis represents luminance value of an input for which D range compression is performed, and the vertical axis represents luminance value after compression. Here, an example of a conversion curve in the case where the luminance range on the input side is 1000 [nit] and the luminance range on the output side is 100 [nit] is shown. In the case of the example shown in FIG. 1, HDR image data having a luminance range of 1000 nit is compressed to a luminance range of 100 nit by a compression characteristic as shown in FIG. 1.

A noise region detection unit 404 detects noise with respect to an input image inputted by the image input unit 401. In accordance with the processing of the noise region detection unit 404, the input image can be divided into two regions, a noise region and a non-noise region. For example, a pixel having a high-frequency and a low amplitude is detected as a pixel included in a noise region. In order to extract the high-frequency value, an existing method such as a Laplacian filter may be used. In the present embodiment, the high-frequency value H obtained in the frequency separation unit 4022 is used. This makes it possible to reduce the number of times of filter processing and to perform processing at higher speed. When the value of the high-frequency value H is equal to or larger than a division threshold, it is detected as noise. The result of detection by the noise region detection unit 404 is held for each pixel as information of 0 (non-noise region) and 1 (noise region), and is used by the contrast correction unit 402. The division threshold for detecting noise is determined based on the dynamic range and ISO sensitivity at the time of capturing the input image. For example, when the ISO sensitivity is 12800, the division threshold is set to a value of 1% of the dynamic range at the time of capturing, for example.

High sensitivity noise occurs in accordance with amplifying a signal stored in a sensor in order to obtain high sensitivity imaging information (image information) in a camera which is an imaging device, and also amplifying a noise signal riding on the sensor together with a signal that occurs at the time of light reception. Therefore, the division threshold of the noise signal also changes depending on the sensor of the camera. Further, there may be cases where the camera side also performs processing for suppressing high sensitivity noise, and there are cases where the division threshold cannot be determined with only the ISO sensitivity or the dynamic range at the time of capturing. In this case, an input from a user may be performed as an external input so that the detection threshold of the noise region can be changed. By determining the division threshold based on a user input, it becomes possible to detect a noise region optimal for the type of camera, capturing condition, and the like.

The gamut mapping unit 405 performs gamut mapping on image data inputted to the gamut mapping unit 405 to the color gamut of the printer (output device) by using a method such as three-dimensional LUT (hereinafter, referred to as a 3DLUT). In the present embodiment, the mapping characteristic of the gamut mapping is referred to as a color conversion characteristic.

FIG. 12 is a diagram for describing gamut mapping. In FIG. 12, the horizontal axis represents Cr in the YCbCr color space, and the vertical axis represents luminance value Y. An input color gamut 1201 indicates the color gamut of image data input to the gamut mapping unit 405. The output color gamut 1202 indicates the color gamut after gamut mapping. Therefore, the input color gamut 1201 of the image data is gamut-mapped to the output color gamut 1202 which is the color gamut of the output device side. Here, it is assumed that the output color gamut 1202 corresponds to the color gamut of the printer 308. Therefore, the input color gamut 1201 is gamut-mapped to the output color gamut 1202 which is the color gamut of the printer 308.

In the present embodiment, if the input color is (Y, Cb, Cr), it is converted into (Y', Cb', Cr'). If the input color is a color space different from YCbCr, the input color is subject to a color space conversion to YCbCr, and then gamut mapping is performed. Primary colors 1203, 1206 of the input color gamut 1201 are mapped to primary colors 1204, 1205 of the output color gamut 1202, respectively. Although the luminance values of the primary colors 1203 and 1206 are the same luminance values, the primary colors 1204 and 1205 after gamut mapping have different luminance values. As described above, when the color gamut of the input and output of the gamut mapping do not have similar shapes, even the same input luminance value is mapped to a different output luminance value depending on the hue. An outer region 1207 of the color gamut represented by the hatched lines (the difference between the input color gamut 1201 and the output color gamut 1202) is a color gamut that cannot be represented by the printer 308. The outer region 1207 of the color gamut is compressed and mapped to a greater extent within the output color gamut 1202 than an inner region 1208 of the color gamut (a portion where the input color gamut 1201 and the output color gamut 1202 overlap). In the inner region 1208 of the color gamut, mapping is performed to the nearest color in the color space. For example, in the input color, a contrast 1209 of the two colors is compressed and mapped to a contrast 1211. On the other hand, the contrast 1210 of the two colors is mapped to the same contrast as the input after mapping. As described above, since a color outside the output color gamut 1202 is mapped with more compression than for a color located in the inner region 1208, the contrast of the color outside of the output color gamut also drops.

An image output unit 406 performs image processing for output by the printer 308. The image data that is subjected to gamut mapping by the gamut mapping unit 405 is subjected to color separation for ink colors to be printed by the printer 308. Furthermore, the image output unit 406 performs desired image processing necessary for output by the printer 308, such as quantization processing for making a conversion to binary data representing whether or not to eject ink, using dither or error diffusion processing.

[Process Flow]

Figure 5:
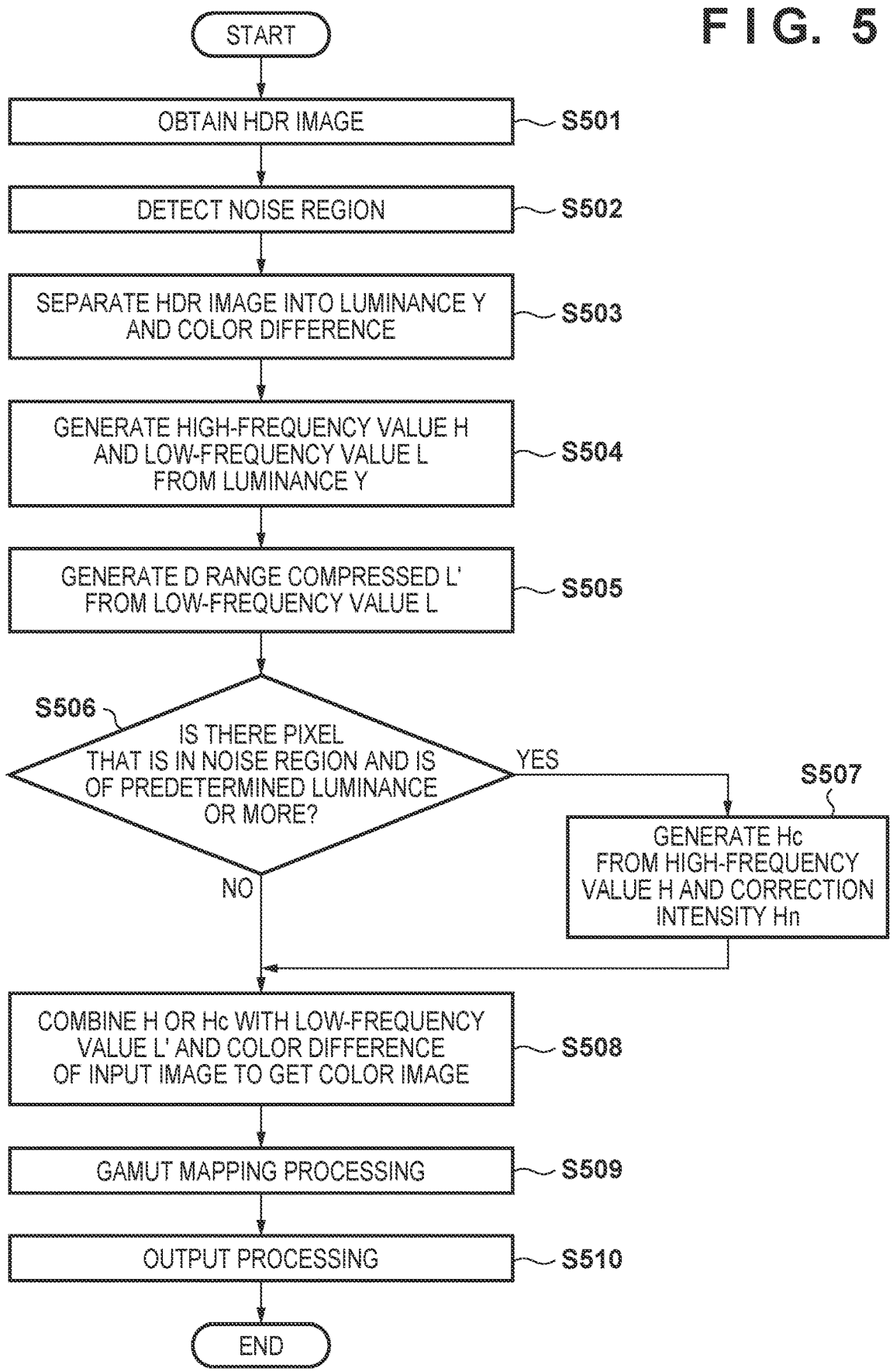
FIG. 5 is a flowchart of processing according to the first embodiment.

FIG. 5 illustrates a flowchart of processing according to the present embodiment. This processing flow is realized, for example, by the CPU 302 of the image processing apparatus 301 reading and executing programs stored in the HDD 304 or the like. Note that the details of the processing in each step of FIG. 5 correspond to processing described with reference to FIG. 4. In addition, the order of each step does not necessarily need to be limited to that shown in FIG. 5, and some steps may be switched.

In step S501, the image processing apparatus 301 obtains a target HDR image using the image input unit 401.

In step S502, the image processing apparatus 301 performs noise detection processing by the noise region detection unit 404 on the HDR image obtained in step S501, and generates a noise detection result.

In step S503, the image processing apparatus 301 performs a process of separating the HDR image obtained in step S501 into luminance value Y and color difference (Cb, Cr) in accordance with the color conversion unit 4021.

In step S504, the image processing apparatus 301 performs the frequency separation processing by the frequency separation unit 4022 on the luminance value Y generated in step S503, and generates the high-frequency value H and the low-frequency value L. In the present embodiment, by the above-described method, from the luminance value Y of the image data, a high-frequency component is extracted as a first component and a low-frequency component is extracted as a second component.

In step S505, the image processing apparatus 301 performs D range compression processing in accordance with the D range compression unit 403 on the low-frequency value L generated in step S504, and generates a D-range-compressed low-frequency value L'.

In step S506, the image processing apparatus 301 determines whether or not the high-frequency correction processing has been performed on each pixel based on the noise detection result generated in step S502 and the luminance value Y generated in step S503. Here, it is determined whether or not there is a pixel that is a noise pixel and has a luminance value larger than a predetermined luminance value Y1th. A corresponding pixel is set as a target of the correction process. If it is determined that there is a noise pixel and a pixel having a luminance value larger than the predetermined luminance value Y1th, the process proceeds to S507 (YES in step S506), and otherwise the process proceeds to S508 (NO in step S506).

In step S507, the image processing apparatus 301, in accordance with the high-frequency correction unit 4023, generates, based on a noise correction intensity Hn calculated in advance, a corrected high-frequency value Hc for the target pixel from the high-frequency value H generated in step S504. An example of the correction method is shown in the following Equation (10). The noise correction intensity Hn is desirably less than 1.0. By setting the value to less than 1.0, it is possible to suppress the high-frequency value H as the noise, and it is possible to suppress the emphasis of noise.

$$Hc = Hn \times H \hspace{2cm} \text{Equation (10)}$$

Note that, when the frequency separation unit 4022 generates the high-frequency value as represented by the Equation (7), the corrected high-frequency value Hc can be calculated by the following Equation (11).

$$Hc = Hn + H \hspace{2cm} \text{Equation (11)}$$

In step S508, the image processing apparatus 301 generates a color image (Yc, Cb, Cr) in accordance with the image combining unit 4024. The inputs here are the color difference (Cb, Cr) produced in step S503, the D-range-compressed low-frequency value L' produced in step S505, and the high-frequency value H produced in step S504 or the corrected high-frequency value Hc produced in step S507. Based on these pieces of information, the images are combined to generate a color image (Yc, Cb, Cr).

In step S509, the image processing apparatus 301 receives the color image (Yc, Cb, Cr) generated in step S508, and performs gamut mapping processing in accordance with the gamut mapping unit 405. As a result, a mapped image is generated.

In step S510, with the mapped image generated in step S509 as an input, the image processing apparatus 301 performs output processing with respect to the printer 308, in accordance with the image output unit 406. Then, this processing flow ends.

Thereafter, based on the data generated by the image output unit 406, printing is performed by the printer 308, whereby a printed material in which high-frequency contrast is corrected and emphasis of high sensitivity noise is suppressed can be obtained.

As the predetermined luminance value Y1th used in step S506 of FIG. 5, a luminance value corresponding to a bright portion represented in the output image may be used. For example, configuration may be taken such that, if the output image is in an sRGB format, half of a representable luminance range, in other words 50 [cd/m$^2$], is set to a predetermined luminance value Y1th, and a determination is made as to whether a luminance value is greater than or equal to this. By doing so, the effect of noise removal can be obtained in the widest expressible luminance range.

Alternatively, the predetermined luminance value Y1th may be the maximum luminance value that can be expressed by an output side. For example, when the output device is a printer and prints on glossy paper, the maximum luminance value is about 80 [cd/m$^2$] in standard illumination light (100 [cd/m$^2$]). In this instance, the predetermined luminance value Y1th is set to 80 [cd/m$^2$]. By doing so, the effect of noise removal can be obtained in a luminance range that is optimal for printed material. Note that, since the maximum luminance value differs depending on the sheet, it is possible to achieve a noise removal effect in an optimum luminance range for each sheet by obtaining information of each sheet to be printed. Similarly, since the maximum luminance value can vary depending on the viewing environment of the printed matter, by acquiring information on the viewing environment, it is possible to obtain a noise removal effect in an optimum luminance range for the viewing environment.

When the expressible luminance range of the output side is unknown or indefinite, the maximum luminance value defined by the image format may be used. For example, 100 [cd/m$^2$] in the case of the sRGB format. In this instance, the predetermined luminance value Y1th is set to 100 [cd/m$^2$]. By doing so, even if the expressible luminance range of the output device is unknown, it is possible to achieve the effect of noise removal in a bright portion.

Figure 11:
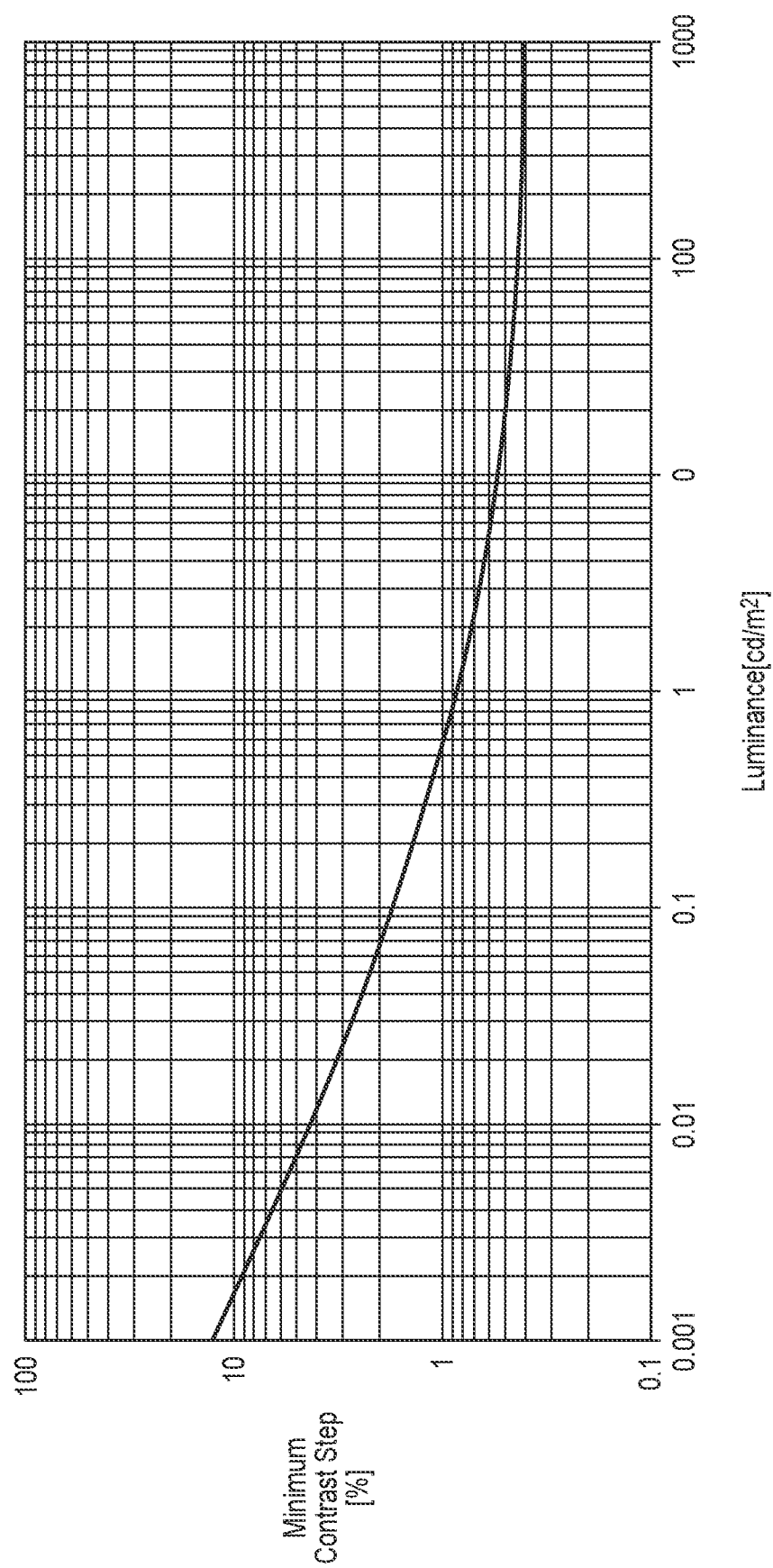
FIG. 11 is a diagram showing an example of a visual observation limitation curve according to an embodiment of the present invention.

Visual characteristics may also be used to determine the predetermined luminance value Y1th. FIG. 11 shows Berten visual characteristics. As shown in FIG. 11, visual characteristics of a person are that the higher the luminance value of an image, the worse the sensitivity of a luminance difference. A luminance difference at which the amplitude value of the noise calculated by the noise region detection unit 404 can be discriminated in terms of visual characteristics can be set as the predetermined luminance value Y1th. It is possible to calculate a luminance difference that can be discriminated using the following Equation (12). When the amplitude of the noise is w and the minimum discrimination coefficient at a certain luminance value Y is fm(Y), Y1th for which Equation (12) holds is calculated. The minimum discrimination coefficient corresponds to the values of the vertical axis of the Berten visual characteristics diagram of FIG. 11.

$$W = \frac{2fm(Y1th)}{1 - fm(Y1th)} Y1th \quad \text{Equation (12)}$$

fm(Y) may be obtained by referring to a table using a 1DLUT approximated from the Berten visual characteristic graph of FIG. 11. Alternatively, the results of Equation (12) may be approximated to a 1DLUT and generated as a table, and may be obtained by referring to this table. Note that, between the grid points of the 1DLUT may be calculated using linear interpolation. For example, when the amplitude value w of noise is 2.5 [cd/m$^2$], the predetermined luminance value Y1th is 200 [cd/m$^2$].

Alternatively, configuration may be taken to calculate either a luminance value from before D range compression or a D-range-compressed luminance value. For example, when a calculation is performed from the D-range-compressed luminance value, it is possible to obtain an optimum noise removal effect when a printed material is output.

In the embodiment described above, the luminance value of the input image or the output image is used, but a luminance value having a low-frequency value may be used. By using a luminance value having a low-frequency value, switching of on/off of noise removal for the same object is reduced, and it is possible to prevent an unnatural tone.

In the present embodiment, a printer has been described as an example of the output device, but there is no limitation to this, and for example, a display or other output device may be used. In this case as well, a similar effect can be obtained.

Second Embodiment

Figure 2A:
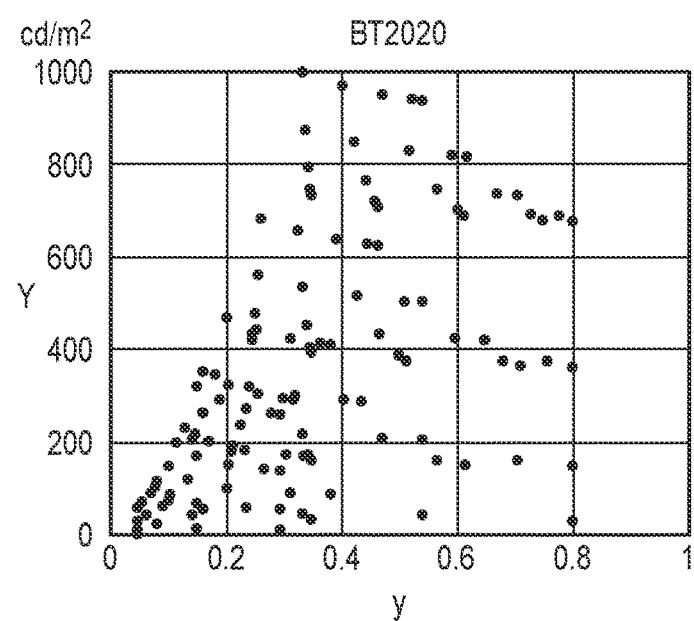
FIGS. 2A and 2B are color gamut diagrams of a luminance range according to an embodiment of the present invention.
Figure 2B:
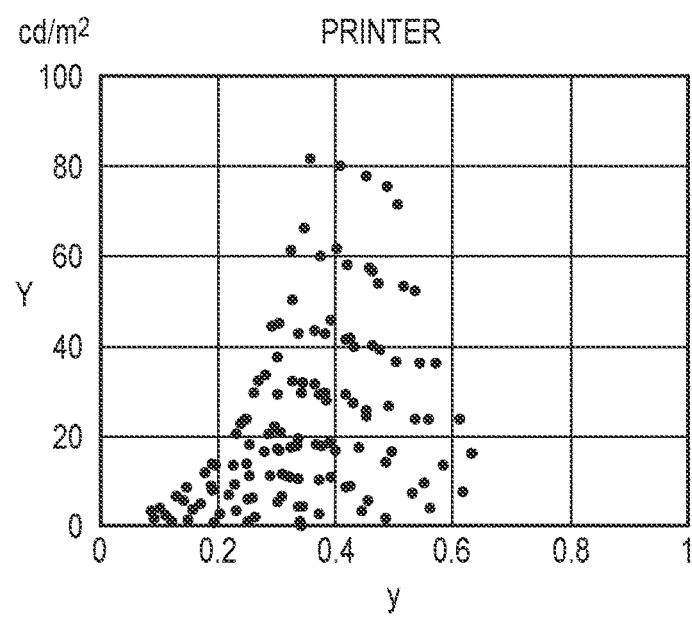

Description will be given regarding a second embodiment of the present invention. Image data subject to D range compression to the luminance range of an output device (printer) needs to be gamut-mapped to the color gamut of the output device. FIG. 2A and FIG. 2B are diagrams for describing the color gamut according to the present embodiment. FIG. 2A shows a color gamut of BT.2020 with a luminance range of 1000 nit. FIG. 2B shows a color gamut printed by a printer. In FIG. 2A and FIG. 2B, the horizontal axis represents the y of xy chromaticity, and the vertical axis represents luminance value. Comparing the BT.2020 color gamut with that of the printer, the color gamut shapes are not similar. When the shapes of the color gamut of the input image data and the color gamut of the printer are very different, for example, even if the contrast correction is performed by the method described in Japanese Patent Laid-Open No. 2011-86976, due to compression in accordance with gamut mapping, there will be a difference from the contrast intensity intended for a contrast correction when printing is performed by the printer.

In the first embodiment, noise emphasis is suppressed by integrating a noise correction intensity Hn that is less than 1.0 and uniform, as indicated by Equation (10). However, the degree of noise emphasis varies in accordance with chromaticity for the reasons described above. Therefore, the noise correction intensity Hn needs to be changed in accordance with the chromaticity.

[Description of Overall Image Processing]

Hereinafter, the contrast correction processing according to the present embodiment will be described with reference to FIG. 6. The contrast correction processing according to the present embodiment is processing for performing predetermined image processing when HDR image data is printed by the printer 308. To avoid redundancy in the description, only differences from the configuration of FIG. 4 described in the first embodiment will be described.

Figure 6:
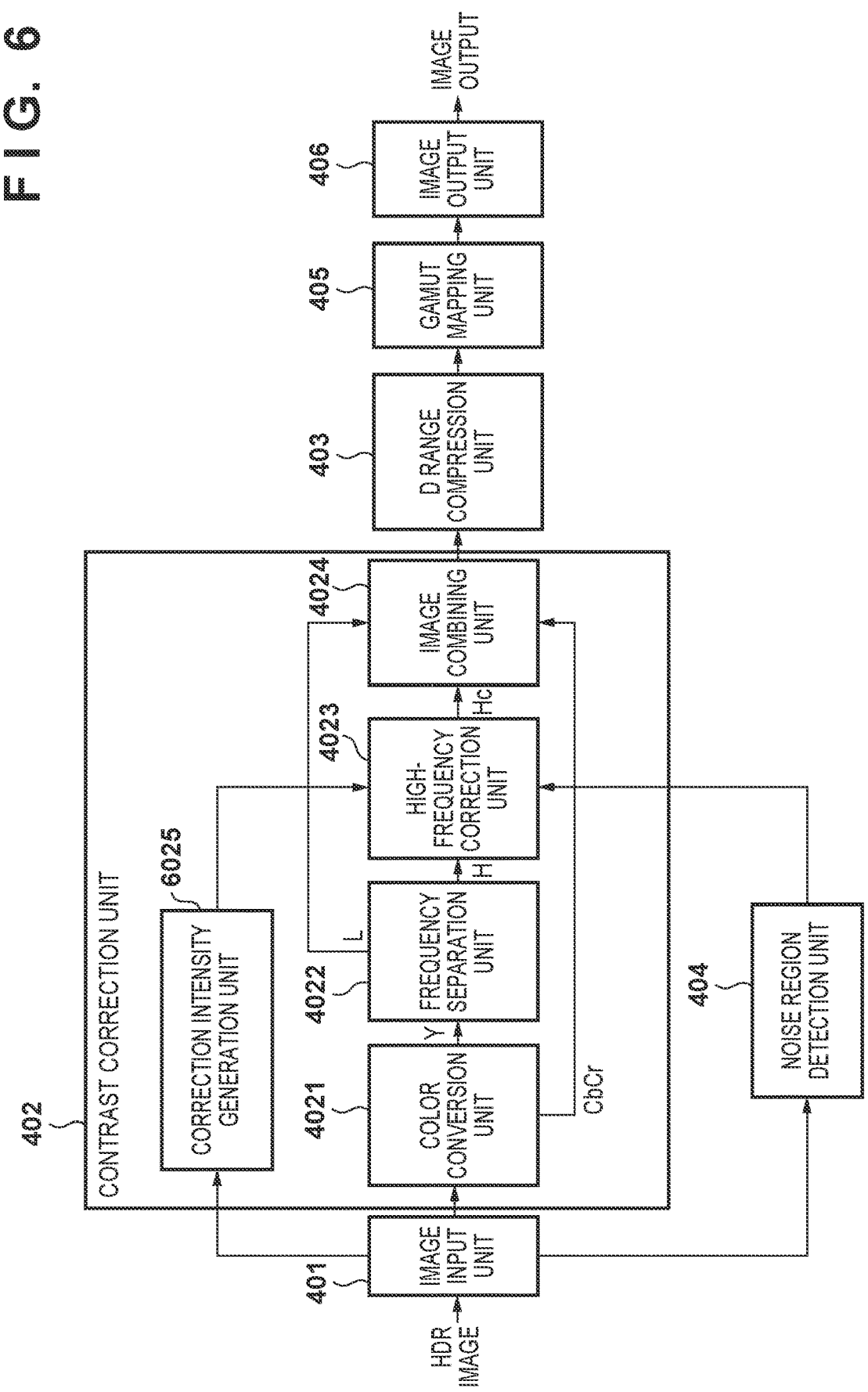
FIG. 6 is a diagram showing an example of a software configuration according to a second embodiment.

As a difference between the configuration of FIG. 6 of the present embodiment and the configuration of FIG. 4 described in the first embodiment, in the present embodiment, the correction intensity generation unit 6025 is provided, and the timing of processing by the D range compression unit 403 is different.

The correction intensity generation unit 6025 determines the correction intensity at the time of performing the contrast correction. Assuming that the gamut correction intensity to be determined is Hm, a target high-frequency value which is to be a target of correction is Ht, and a gamut-mapped output high-frequency value is H', the gamut correction intensity Hm is calculated by the following Equation (13).

$$Hm = Ht/H' \quad \text{Equation (13)}$$

Note that, when the frequency separation unit 4022 generates the high-frequency value as represented by Equation (7) as described above, the gamut correction intensity Hm is calculated by the following Equation (14).

$$Hm = Ht - H' \quad \text{Equation (14)}$$

The target high-frequency value Ht represents the high-frequency value H generated by the frequency separation unit 4022. The high-frequency value H' is a high-frequency value of an image obtained by performing D range compression and gamut mapping on an input image, and represents a high-frequency value of an output image which is to be output by the printer 308. Since the high-frequency contrast of the image decreases between input and output, a reverse bias corresponding to a reduction in contrast is set as the correction intensity, as expressed by Equation (13). By determining the gamut correction intensity Hm using the high-frequency values before and after the gamut mapping, it is possible to correct a contrast intensity difference based on a color gamut shape difference between input and output.

The image combining unit 4024 performs a recombination into a color image by taking as inputs the corrected high-frequency value Hc outputted from the high-frequency correction unit 4023, the low-frequency value L outputted from the frequency separation unit 4022, and the color difference (Cb, Cr) outputted from the color conversion unit 4021. The method of combining is represented by the following Equation (15). In Equation (15), the luminance image Yc is obtained by multiplying the high-frequency value Hc and the low-frequency value L.

$$Yc = Hc \times L \quad \text{Equation (15)}$$

Note that, when the frequency separation unit 4022 generates the high-frequency value as represented by Equation (7) as described above, the luminance image Yc is calculated by the following Equation (16).

$$Yc = Hc + L \quad \text{Equation (16)}$$

The D range compression unit 403 performs processing after the contrast correction unit 402.

[Process Flow]

Figure 8:
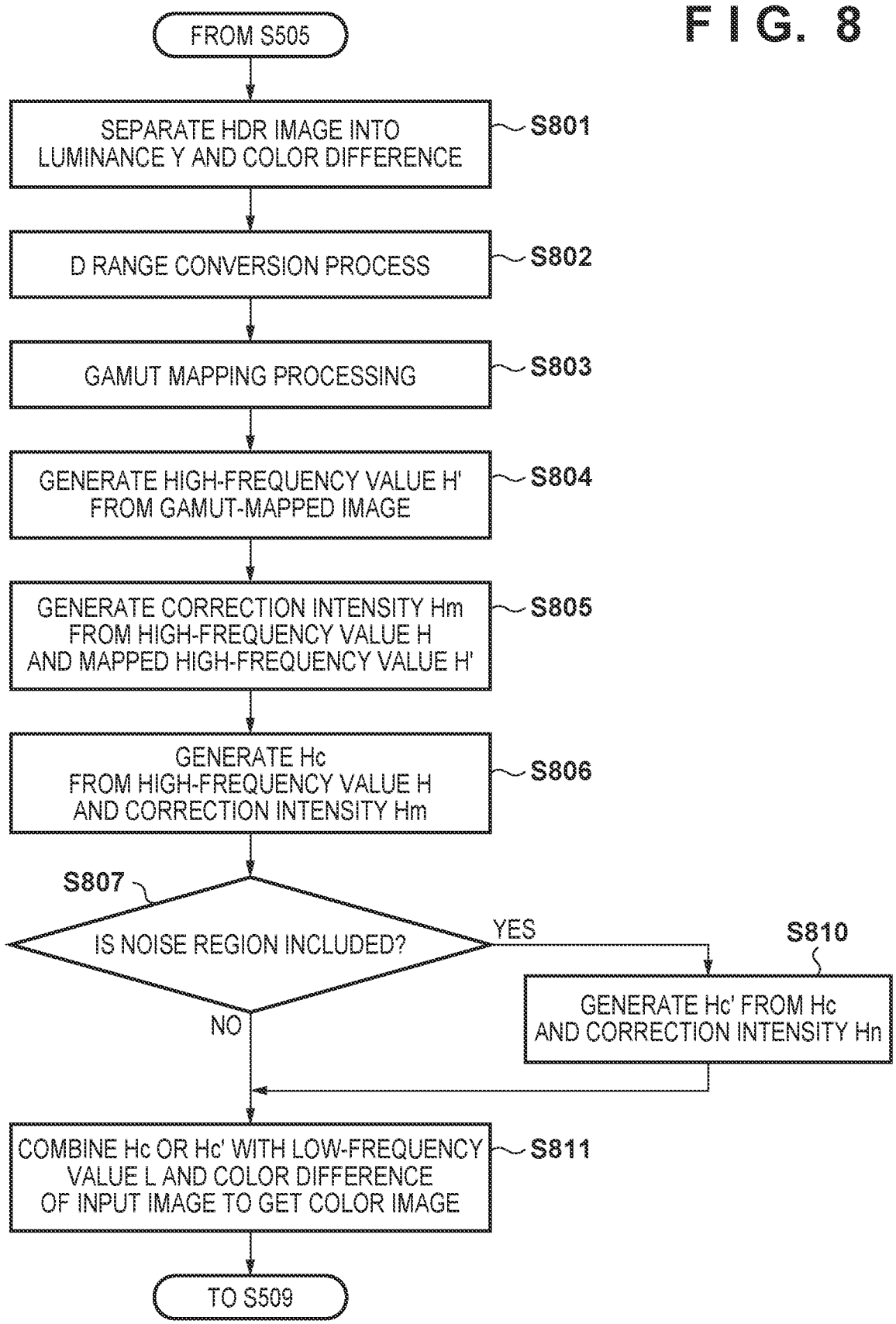
FIG. 8 is a flowchart of processing according to the second embodiment.

FIG. 8 illustrates a flowchart of processing according to the present embodiment. This processing flow is realized, for example, by the CPU 302 of the image processing apparatus 301 reading and executing programs stored in the HDD 304 or the like. This processing flow is performed by replacing the portion of step S506 to S508 processing in the processing flow of FIG. 5 described in the first embodiment. FIG. 6 corresponds to the processing of the correction intensity generation unit 6025, the high-frequency correction unit 4023, and the image combining unit 4024.

In step S801, the image processing apparatus 301 performs processing on an inputted image for separating the input image into a luminance value Y and a color difference (Cb, Cr), which is performed in the color conversion unit 4021.

In step S802, the image processing apparatus 301 performs processing of the D range compression unit 403 on the luminance value Y to generate the D-range-compressed luminance value Y'.

In step S803, the image processing apparatus 301 performs processing of the gamut mapping unit 405 with the D-range-compressed luminance value Y' and the color difference as inputs, and generates a gamut-mapped image (Y", Cb', Cr').

In step S804, the image processing apparatus 301 performs the processing of the frequency separation unit 4022 with the gamut-mapped luminance value Y" as an input, and generates the gamut-mapped high-frequency value H'.

In step S805, the image processing apparatus 301 performs processing of the correction intensity generation unit 6025 with the high-frequency value H generated in step S504 of FIG. 5 in the first embodiment and the gamut-mapped high-frequency value H' generated in step S804 as inputs, and generates the gamut correction intensity Hm.

In step S806, the image processing apparatus 301 generates the contrast-corrected high-frequency value Hc based on the high-frequency value H generated in step S504 and the gamut correction intensity Hm generated in step S804. The correction method is represented by the following Equation (17).

$$Hc = Hm \times H \quad \text{Equation (17)}$$

Note that, when the frequency separation unit 4022 generates the high-frequency value as represented by the Equation (7), the corrected high-frequency value Hc can be represented by Equation (18).

$$Hc = Hm + H \quad \text{Equation (18)}$$

By multiplying the gamut correction intensity Hm generated by the correction intensity generation unit 6025 by the high-frequency value H of the input image, the state of the high-frequency contrast of the input image can be corrected for a time of outputting by the printer 308.

In step S807, the image processing apparatus 301 determines whether or not to perform the processing of step S810 based on the noise detection result generated in step S502 of FIG. 5 in the first embodiment. When it is determined that a noise pixel is included in the input image, it is assumed that the processing of step S810 is performed. When there is a noise pixel (YES in step S807), the process proceeds to step S810, and when there is no noise pixel (NO in step S807), the process proceeds to step S811.

In step S810, the image processing apparatus 301 generates the corrected noise-suppressed high-frequency value Hc' based on the noise correction intensity Hn that was calculated in advance, from the corrected high-frequency value Hc generated in step S806. The correction method in the present embodiment is represented by the following Equation (19). Hn is desirably less than 1.0. By setting the value to less than 1.0, it is possible to suppress the high-frequency value H as noise, and it is possible to suppress the emphasis of noise. By performing S806 and S810, it is possible to perform noise removal while correcting a contrast difference due to a color gamut shape difference.

$$Hc' = Hn \times Hc \quad \text{Equation (19)}$$

Note that, when the frequency separation unit 4022 generates the high-frequency value as represented by the Equation (7), the corrected noise-suppressed high-frequency value Hc' can be represented by Equation (20).

$$Hc'=Hn+Hc \quad \text{Equation (20)}$$

In step S811, the image processing apparatus 301 generates a color image (Yc, Cb, Cr) by performing processing in accordance with the image combining unit 4024. The inputs are the color difference (Cb, Cr) produced in step S503, the low-frequency value L produced in step S504, and the corrected high-frequency value He produced in step S806, or the corrected high-frequency value Hc' produced in step S810.

Above, description was made using an example in which the gamut correction intensity Hm is generated from a high-frequency value of an input image and a high-frequency value of an output image. Apart from this, examples of generating a 3DLUT format for the correction intensity information will be described with reference to FIG. 14. For the correction intensity information, a contrast reduction amount for the input image and the output image is set as a reverse bias. Here, the output image is a state in which the input image has been subjected to D range compression and gamut mapping. In FIG. 14, an input reference color (224, 0, 0) and a contrast target color (232, 8, 8) are changed to (220, 8, 8) and (216, 12, 12), respectively, by D range compression and gamut mapping. The difference RGB between the input and the output representing the contrast between the reference color and the contrast target color are "13.9" and "6.9", respectively. The difference RGB here indicates the distance in the RGB three-dimensional space. The reverse bias of the contrast ratio is calculated by the following Equation (21). The reverse bias of the contrast difference is calculated by the following Equation (22).

$$13.9/6.9=2.0 \quad \text{Equation (21)}$$

$$13.9-6.9=7 \quad \text{Equation (22)}$$

By such a method, it is possible to generate the correction intensity for the input color. By calculating this for each of the 3DLUT grid values, it is possible to generate a 3DLUT whose outputs represent the gamut correction intensity Hm with respect to the input (R, G, B). In this manner, it is possible to generate correction intensity information of a characteristic for which the gamut correction intensity Hm is greater for a color outside the color gamut into which there is large compression in accordance with the gamut mapping than for a color within the color gamut that is smaller in compression. When the gamut correction intensity Hm is generated in the 3DLUT format, the high-frequency value of the input image and the high-frequency value of the output image do not need to be calculated, and the contrast correction can be performed with a low amount of memory.

Third Embodiment

Description will be given regarding a third embodiment of the present invention. Descriptions of portions overlapping with those of the first and second embodiments are omitted. In the first embodiment and the second embodiment, if the noise correction intensity Hn is less than 1.0, a noise suppression effect can be obtained. However, in order to further achieve a noise suppression effect in the bright portion of the image, it is necessary to change the noise correction intensity in accordance with the luminance value Y. The luminance value Y generated by the color conversion unit 4021 is used as the luminance value Y at this time. In the present embodiment, the noise correction intensity is determined for each pixel to be processed at a time of the processing of step S507 of FIG. 5 of the first embodiment or step S810 of FIG. 8 of the second embodiment.

The degree of change can be set by using the threshold luminance value Y2th and the maximum luminance value Y2max of the input image calculated from capturing information obtained by using a capturing information obtaining means (not shown). For example, the capturing information obtaining means may obtain information to be used from information embedded in the input image. The capturing information obtaining means may obtain information that was stored in a file different from the input image. A method of calculating the threshold luminance value Y2th and the maximum luminance value Y2max are described below. First, the lens aperture value, exposure period, and ISO sensitivity are obtained from the capturing information. Thereafter, based on the obtained information, the EV value is calculated using the following Equation (23). Let the lens aperture value be F, the exposure period be T, and the ISO sensitivity be ISO.

$$EV = \log_2\left(\frac{F^2}{T\left(\frac{ISO}{100}\right)}\right) \quad \text{Equation (23)}$$

Figures 9, 10:
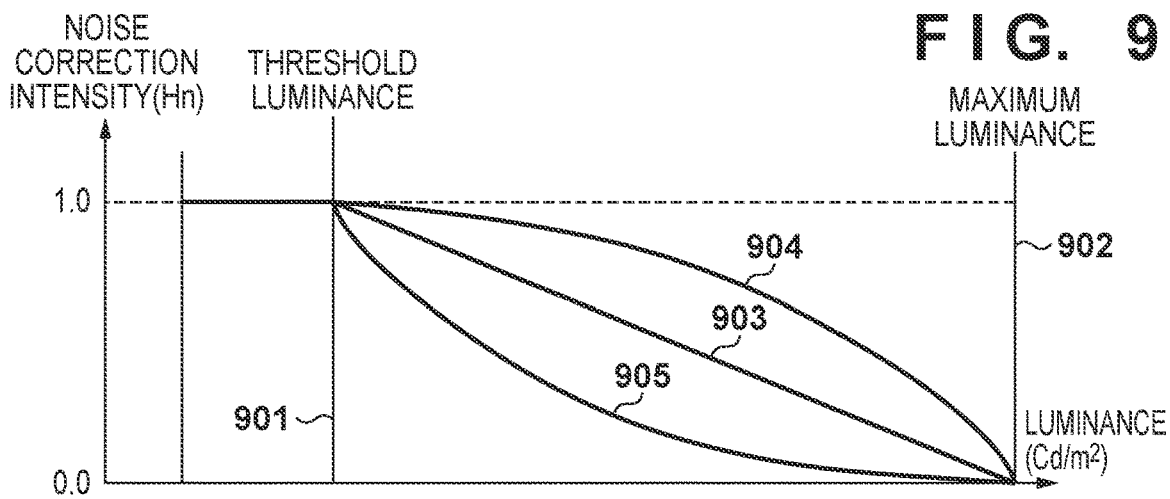
FIG. 9 is a diagram for describing a noise correction intensity according to the third embodiment.
FIG. 10 is a diagram showing a table for converting from EV values to luminance values according to the third embodiment.

The threshold luminance value Y2th can be calculated from a calculated EV value using a table shown in FIG. 10. FIG. 10 is a diagram in which light intensity and luminance values are associated with EV values. The maximum luminance value Y2max is calculated using the following Equation (24).

$$Y2max=Y2th/0.18 \quad \text{Equation (24)}$$

It is determined so that the noise correction intensity Hn becomes less than 1.0 when the luminance value exceeds the threshold luminance value Y2th, and gets smaller with the maximum luminance value Y2max as an end point. FIG. 9 shows an example of a table for a time of determining the noise correction intensity Hn. In FIG. 9, the vertical axis represents the noise correction intensity Hn, and the horizontal axis represents the luminance value. In FIG. 9, a threshold luminance value 901 and a maximum luminance value 902 are shown. A noise correction intensity curve 903 is a case where the noise correction intensity simply decreases from the threshold luminance value 901 in accordance with an increase of the luminance value. A noise correction intensity curve 904 projects above the noise correction intensity curve 903. This is effective when there is a desire to not abruptly change noise suppression in the vicinity of the threshold luminance value. A noise correction intensity curve 905 projects below the noise correction curve 903. This is effective when there is a desire to strengthen the noise suppression effect in a high luminance region.

The noise correction curve may be switched for each image according to a histogram characteristic of the image. By setting the luminance region in which the amount of change of the noise correction curve is large to a luminance region for which the histogram is low, it is possible to minimize a bad region in the image while improving a noise suppression effect. The noise correction intensity Hn with which the noise is least likely to be visually recognized is calculated by using the following Equation (25) using the Berten visual characteristics illustrated in FIG. 11. Let Hp be the high-frequency value of the target pixel, Yp be the luminance value of the target pixel, and fm(Y) be the minimum discrimination coefficient at a certain luminance value Y. Equation (25) is valid when the luminance value Yp exceeds the threshold luminance value Y2th. Otherwise, Hn=1.0.

$$Hn = \frac{\frac{2fm(Yp)}{1-fm(Yp)}Yp}{H} \qquad \text{Equation (25)}$$

With the above configuration, it is possible to set the most indiscriminable noise correction intensity Hn in terms of visual characteristics. Alternatively, the result of Equation (25) may be approximated to a 1DLUT and obtained by referring to a table. Note that, between the lattice points of the 1DLUT may be calculated using linear interpolation.

After calculating the maximum luminance value Y2max of the input image, the threshold luminance value Y2th may be changed to the threshold luminance value Y1th described in the first embodiment. By doing so, it is possible to, by using the noise correction intensity Hn, perform an equivalent process on a pixel whose luminance value is equal to or higher than a predetermined luminance value, which is a determination criterion of step S506 of FIG. 5.

Other Embodiments

In the first embodiment, a noise region is detected, and the intensity of contrast correction is lowered in the region, thereby suppressing an increase of the noise. A similar method may be controlled so as to be performed on a predetermined region. For example, by performing processing on a skin region of a person as a predetermined region, it is possible to suppress the emphasis of wrinkles and the like of the skin. In this case, skin region detection is performed instead of noise region detection. A known method may be used for skin region detection. For example, face detection is performed to detect a face region. Color in the face region is set as a skin color, and, with respect to the whole image, regions whose color matching the skin color with are detected as skin regions. A detected result is held as information of 0 (non-skin region) or 1 (skin region) for each pixel, and the contrast correction unit 402 performs a correction using a skin correction intensity Hs instead of the noise correction intensity Hn. By doing so, it is possible to suppress contrast emphasis of a skin region.

Further, contrast suppression for a skin region and a noise region can be performed at the same time. In this case, the detection result is divided into four regions of 0 (non-noise region and non-skin region), 1 (noise region and non-skin region), 2 (non-noise region and skin region), and 3 (noise region and skin region). A correction intensity Hx of each region in the contrast correction unit 402 is as follows. In the case of a non-noise region and a non-skin region, the correction intensity Hx=0. In the case of a noise region and a non-skin region, Hx=Hn. In the case of a non-noise region and a skin region, Hx=Hs. In the case of a noise region and a skin region, Hx=Hs×Hn. By doing so, it is possible to simultaneously suppress contrast emphasis of a skin region and a noise region.

In the examples described above, the skin region is given as an example, but there is no limitation to this, and other predetermined regions may be targeted.

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-034735, filed Feb. 27, 2019, which is hereby incorporated by reference herein in its entirety.

What is claimed is:

1. An image processing apparatus, comprising:
   a detection unit configured to detect a predetermined region of an image from image data; and
   a correction unit configured to correct a value of luminance in the predetermined region detected by the detection unit,
   wherein the correction unit corrects a high-frequency value out of a low-frequency value and the high-frequency value obtained from a luminance value of a pixel having a value of luminance higher than a predetermined threshold in the predetermined region so that a high-frequency contrast weakens.

2. The image processing apparatus according to claim 1, wherein the predetermined region is a region composed of pixels whose frequency is higher than a predetermined frequency and which have a low amplitude.

3. The image processing apparatus according to claim 2, wherein the predetermined frequency is determined based on a visual sensitivity of a person.

4. The image processing apparatus according to claim 1, wherein the predetermined threshold is determined based on a luminance value corresponding to a bright portion in a case of outputting the image data.

5. The image processing apparatus according to claim 1, wherein the predetermined threshold is determined based on a maximum luminance value in a case of outputting the image data.

6. The image processing apparatus according to claim 1, wherein the predetermined threshold is determined based on a maximum luminance value of an image format in a case of outputting the image data.

7. The image processing apparatus according to claim 1, wherein
the image data has a first dynamic range, and
the image processing apparatus further comprises a conversion unit configured to convert a low-frequency value of a luminance value in the image data into a second dynamic range smaller than the first dynamic range.

8. The image processing apparatus according to claim 1, wherein
the image data has a first color gamut, and
the image processing apparatus further comprises a gamut mapping unit configured to perform gamut mapping on the image data to a second color gamut smaller than the first color gamut using a result of correction by the correction unit.

9. The image processing apparatus according to claim 8, wherein the correction unit determines a correction intensity for a high-frequency value based on high-frequency values before and after gamut mapping by the gamut mapping unit.

10. The image processing apparatus according to claim 1, wherein the correction unit determines a correction intensity for a high-frequency value based on capturing information and a luminance value in the image data.

11. The image processing apparatus according to claim 10, wherein the capturing information is at least one of a shutter speed, an aperture value, and an ISO sensitivity.

12. The image processing apparatus according to claim 10, wherein the correction unit determines that the correction intensity for the high-frequency value decreases from the predetermined threshold as a luminance value approaches a maximum luminance value at the time of outputting the image data.

13. The image processing apparatus according to claim 12, wherein the predetermined threshold is obtained in accordance with a maximum luminance value×0.18 in a case of outputting the image data.

14. An image processing method, comprising:
detecting a predetermined region from image data; and
correcting a luminance value in the detected predetermined region,
wherein a high-frequency value out of a low-frequency value and the high-frequency value obtained from a luminance value of a pixel having a luminance value higher than a predetermined threshold in the predetermined region is corrected so that a high-frequency contrast weakens.

15. A non-transitory computer-readable storage medium storing a program for causing a computer to function as:
a detection unit configured to detect a predetermined region from image data; and
a correction unit configured to correct a value of luminance in the predetermined region detected by the detection unit,
wherein the correction unit corrects a high-frequency value out of a low-frequency value and the high-frequency value obtained from a luminance value of a pixel having a luminance value higher than a predetermined threshold in the predetermined region so that a high-frequency contrast weakens.

* * * * *